United States Patent
Hattersley

(10) Patent No.: US 6,581,837 B1
(45) Date of Patent: Jun. 24, 2003

(54) WIRELESS INTERFACE FOR BAR CODE SCANNER

(75) Inventor: John R. Hattersley, Skaneateles, NY (US)

(73) Assignee: Industrial Data Entry Automation Systems Incorporated, Skaneateles, NY (US)

( * ) Notice: Subject to any disclaimer, the term of this patent is extended or adjusted under 35 U.S.C. 154(b) by 119 days.

(21) Appl. No.: 09/603,031

(22) Filed: Jun. 23, 2000

(51) Int. Cl.[7] ................................................ G06K 7/10
(52) U.S. Cl. ........................ 235/462.44; 235/462.45; 235/462.46; 235/472.01; 235/472.02; 235/462.43
(58) Field of Search ....................... 235/462.01, 462.25, 235/472.01, 472.02

(56) References Cited

U.S. PATENT DOCUMENTS

| | | | |
|---|---|---|---|
| 4,945,216 A | | 7/1990 | Tanabe et al. ............... 235/462 |
| 5,142,128 A | | 8/1992 | Perkins et al. ............... 235/375 |
| 5,272,324 A | * | 12/1993 | Blevins ........................ 235/385 |
| 5,307,297 A | | 4/1994 | Iguchi et al. ................ 364/708.1 |
| 5,329,106 A | * | 7/1994 | Hone et al. ............. 235/462.44 |
| 5,610,387 A | * | 3/1997 | Bard et al. ............. 235/462.11 |
| 5,625,180 A | * | 4/1997 | Hanson et al. .......... 235/472.01 |
| 5,640,002 A | * | 6/1997 | Ruppert et al. ............. 235/472 |
| 5,736,721 A | * | 4/1998 | Swartz ........................ 235/383 |
| 5,917,174 A | * | 6/1999 | Moore et al. .......... 235/462.44 |
| 5,939,701 A | * | 8/1999 | Rockstein et al. .......... 235/472 |
| 5,945,660 A | | 8/1999 | Nakasuji et al. ....... 235/462.46 |
| 5,949,056 A | | 9/1999 | White .................... 235/472.01 |
| 6,024,284 A | | 2/2000 | Schmidt et al. ........ 235/462.46 |
| 6,098,886 A | * | 8/2000 | Swift et al. ............. 235/462.44 |
| 6,105,871 A | * | 8/2000 | Campo et al. ............... 235/472 |
| 6,141,719 A | * | 10/2000 | Rafferty et al. ............. 710/131 |

* cited by examiner

*Primary Examiner*—Michael G. Lee
*Assistant Examiner*—Ahshik Kim
(74) *Attorney, Agent, or Firm*—Bernard P. Molldrem, Jr.

(57) ABSTRACT

A powered wireless link device powers a bar code scanner or other optical symbol reader and connects it with a remote computer terminal. The link device has a housing that contains a battery, a data-powered RF (or IR) interface unit, a serial data connector on the housing for connecting to a connector on the cord of the scanner, and a wiring assembly to connect data pins of the connector with corresponding pins of the interface unit, and leads that impose a dc voltage on selected pin or pins of the connector and the interface unit. The wiring arrangement may include a voltage regulator IC. The battery may be removable for replacement or recharging. The wireless link device can be belt worn, where the belt has holsters for the device and for the scanner. The link can be effective up to 500 feet or more, facilitating inventory control or similar functions. A link of over a mile is possible. An optional signal splitter or wye adapter permits two devices, such as a scanner and a printer, to be connected at the same time to the RF interface device.

16 Claims, 4 Drawing Sheets

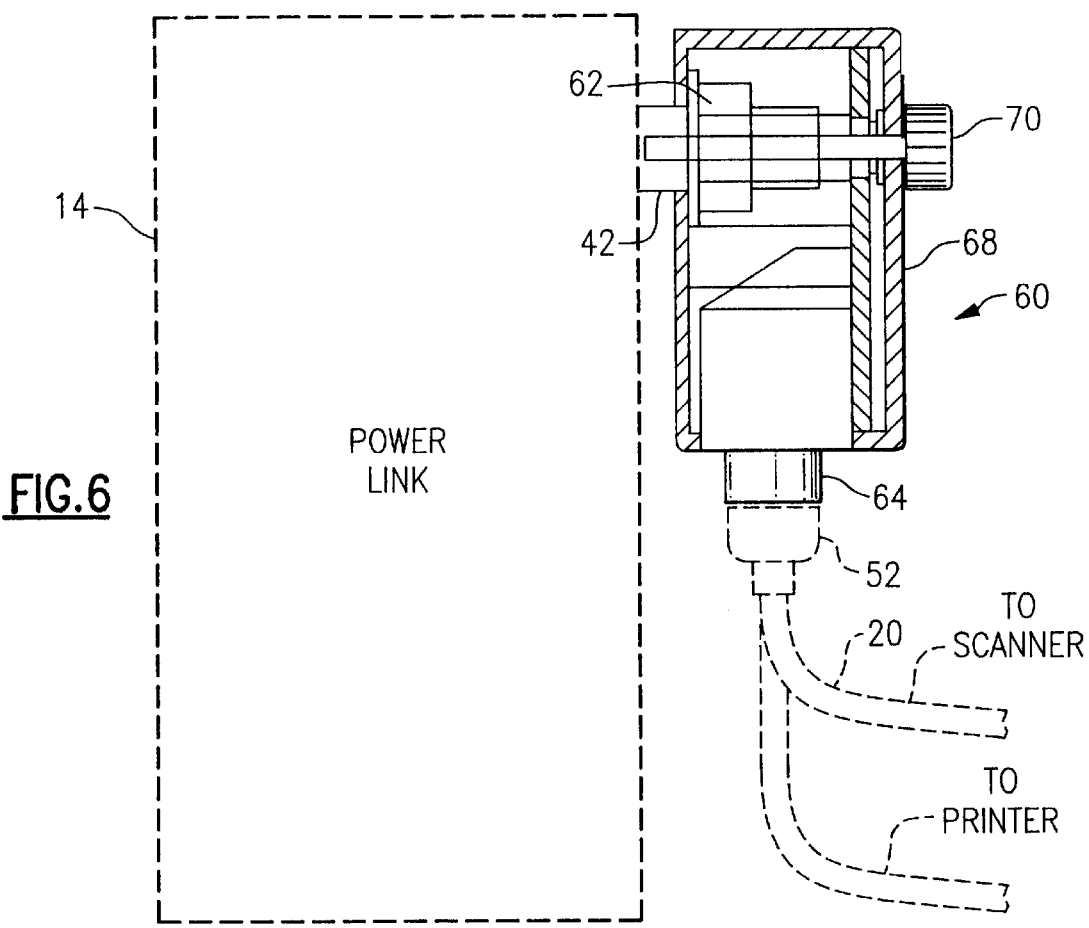
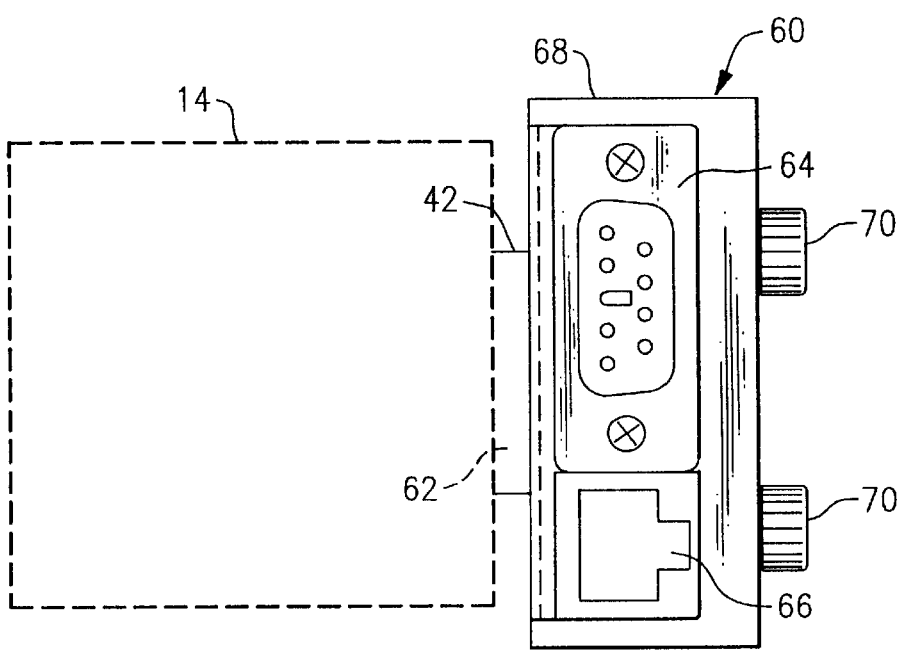

WIRELESS INTERFACE FOR BAR CODE SCANNER

BACKGROUND OF THE INVENTION

This invention is directed to data collection equipment, such as (but not limited to) bar code scanners or similar optical symbol or magnetic scanning devices. The invention is also concerned with arrangements for data collection in an industrial or commercial environment, such as in a factory or warehouse, on a loading dock or pier, in which data from remote locations is directly fed to a central data processor such as a computer. The invention is also concerned with a wireless arrangement that permits the operator conducting an inventory, a shipping or receiving job, or a manufacturing task, to transmit scanned data directly from a remote work location to the central computer station. This concept is highly useful for shipping, receiving, and inventory control applications, but many other typical applications exist, such as hospitals and health care institutions, retailing, libraries, gaming institutions, and construction sites.

Many wireless bar code scanners have been proposed. One of these is described in Schmid et al. U.S. Pat. No. 6,024,284. In this case, the scanner is especially constructed so that the radio or other wireless connection, plus some memory and processing capability, are contained in the scanner. An infrared-coupled bar code scanner is described in Iguchi et al. U.S. Pat. No. 5,307,297, the scanner again being especially constructed for this purpose. These devices are not used with existing scanners, and do not have any provision for coupling to or powering an external scanner. Blevins U.S. Pat. No. 5,272,324 a hands-free scanner arrangement with a radio-frequency transceiver that is worn on the body of the user, and a wrist-mounted scanner terminal, with key pads and viewing screens, for processing and displaying the scanned data. This is connected on one side to the scanner and on the other side to the transceiver and battery pack. The radio transceiver can communicate with a host computer.

To date, no one has proposed a simple and straightforward system for wirelessly linking a conventional hand-held bar code scanner or other data collection device with a computer or similar data processing station. Typically, where the scanner is wire-coupled to the computer, i.e., over a cable using a standard connector such as an RS-232 or other multi-pin connector, the computer power supply may feed a voltage to one or more pins of the connector to power the scanner. Consequently, some means has to be provided to power the scanner if it is used remotely from the computer. At the same time, wireless interconnection devices have become available. These devices can comprise small UHF transmitter/receivers that connect to the serial input terminal of a computer for cable-free connection to another computer or an input/output device, such as a printer. These devices may be parasitically powered, i.e., drawing its power from the device to which it is linked, or they may be powered externally. While it would be desired to use such a device to link the computer with a bar code scanner or similar data collection device, that has not been possible because neither the scanner not the transmitter/receiver unit has its own internal power supply. This has limited wireless scanners to those that have their own radio or infrared transmitters built in and with a power supply built in. Consequently, there is no means currently available to permit wireless connection of the scanners that are popular for industrial and commercial use.

OBJECTS AND SUMMARY OF THE INVENTION

Accordingly, it is an object of this invention to provide a wireless data input system that avoids the drawbacks of the prior art.

It is another object to provide a wireless transmitter/receiver arrangement for powering a bar code scanner and also providing a wireless connection with a remote computer terminal or other data processing station.

It is a further object to provide a lightweight, small-sized assembly that permits an operator or other worker to use a bar code scanner up to 500 feet (i.e., 150 meters) from the computer terminal, and which does not encumber the operator.

According to one aspect of this invention, portable, wireless data collection arrangement employs a two-way wireless interface unit that is adapted for interconnection to a data input device (e.g., a bar code scanner) and is also adapted to communicate wirelessly through a similar or identical remote wireless interface unit with a data processing device, such as a computer terminal. The wireless data collection arrangement also employs a battery supplying dc electrical power at a voltage sufficient to drive the two-way wireless interface unit. There is a multiple-pin connector (i.e., a standard serial data port connector) adapted to connect with a data collection device that has a cable that terminates in a mating multiple-pin connector. Within the arrangement is a wiring harness or similar interconnection arrangement connecting the battery, the two-way wireless interface unit, and the multiple-pin connector for permitting data to pass between the wireless interface unit and selected pins of the connector. The wiring harness also imposes the dc power on a predetermined pin of the connector, such that said battery also powers the data collection device.

According to another aspect of the invention, a wireless arrangement capable of being worn on the person, e.g., on a belt, permits a bar code scanner or other data collection device to be used remotely from a data entry and processing station. In this wireless arrangement, a housing contains a two-way wireless interface unit that is adapted for interconnection with a data input device associated with the data entry and processing station; a battery that supplies dc electrical power at a voltage sufficient to drive the two-way wireless interface unit; a multiple pin connector mounted on the housing and adapted to connect with the scanner or other data collection device through a cable that terminates in a mating multiple-pin connector; and a wiring arrangement connecting the battery, the two-way wireless interface unit, and the multiple-pin connector for permitting data to pass between the interface unit and selected pins of the connector, and also imposing dc power on a predetermined pin of said connector, so that the battery also powers the data collection device. The battery is removably retained in the housing, whereby the battery may be replaced or recharged.

In one favorable application, the arrangement includes a belt to be worn by an operator to hold the wireless arrangement and the bar code scanner. A first holster on the belt holds the wireless arrangement and a second holster holds the scanner or other data collection device.

The above and many other objects, features, and advantages of this invention will present themselves to persons skilled in this art from the ensuing description of selected preferred embodiments of this invention, as described with reference to the accompanying Drawing.

BRIEF DESCRIPTION OF THE DRAWING

FIGS. 6 and 7 are a sectional elevation and a bottom view of a wye connector or splitter adapter that may be employed in an embodiment of this invention.

DETAILED DESCRIPTION OF THE PREFERRED EMBODIMENTS

Figure 1:
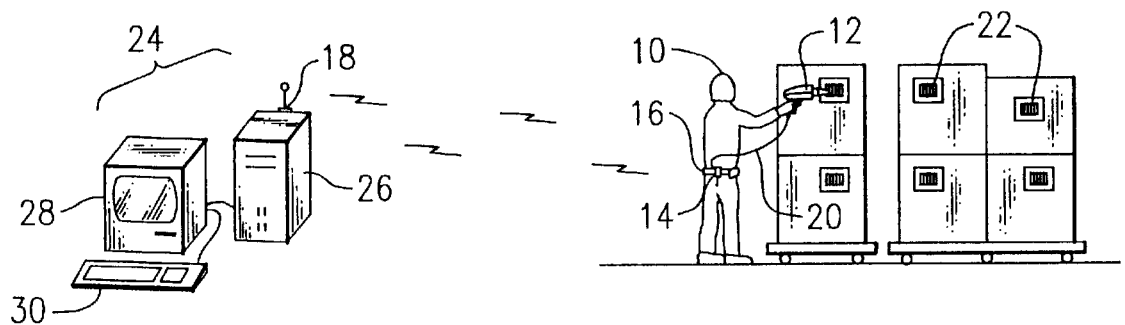
FIG. 1 shows a typical warehouse or dock application of the invention, in which an operator scans optical data on containers, and inputs the data remotely to a base station computer.

With reference to the Drawing, FIG. 1 illustrates one possible application of this invention, where a warehouse worker 10 obtains optically readable data, e.g., on bar coded labels, for entry of the data into a remote data processing terminal, such as a computer terminal. This can be for inventory control purposes. In this case the worker employs a hand-held bar code scanner 12 that is coupled to a wireless interface device 14. In this embodiment the device is worn e.g. on a web belt 16 on the person of the worker 10. The scanner 12 has a cord 20 connecting it to the interface device 14. Here, the scanner is used to read bar code labels 22 on palletized cartons or containers, but could be used for other purposes in other industrial or commercial settings. A remote data processing station 24 here takes the form of a computer terminal 26, with a wireless RF interface 18 that mates directly to a serial input/output connector (not shown) on the computer terminal 26, and communicates on an RF frequency with the wireless interface device 14. The devices used in this embodiment are low-power devices, and have an effective range of about 150 meters, i.e., about 500 feet, on a line of sight. It is possible for other wireless devices to have a much greater range, i.e., up to several miles. This permits the worker 10 to travel over most or all of the floor space in a warehouse or on a loading dock to collect data. The devices 14 and 18 are two-way devices, i.e., receivers and transmitters, and also send verification data back to the scanner 12. Here the computer terminal 26 is shown with an associated monitor 28 and keyboard 30.

Figure 2:
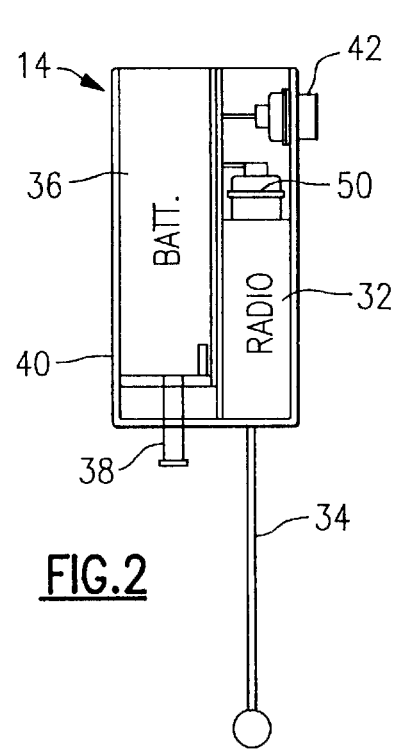
FIG. 2 is a cut-away elevation of a wireless interface device according to one embodiment of this invention.
Figure 3:
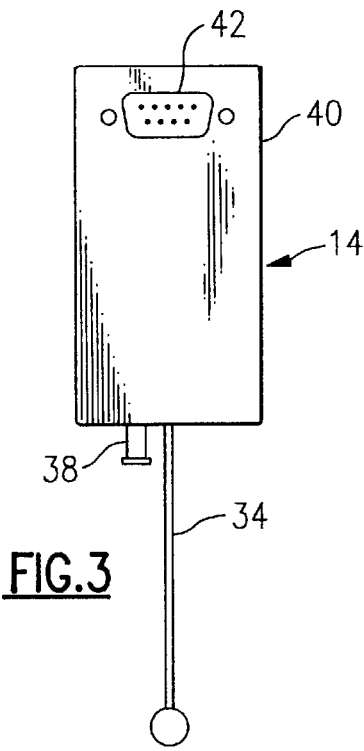
FIG. 3 is a side elevation of the device of this embodiment.

The wireless interface device 14 is shown in the elevational views of FIGS. 2 and 3. At the heart of the device is a matchbox size RF interface unit 32, which is similar or identical to the wireless unit 18 mounted on the computer terminal. This unit in this embodiment can have dimensions of about 3 cm by 5 cm by 1 cm, and a weight of about 60 grams. The device can be packaged within a housing, or can be of an open-board configuration. These communicate at data rates from 300 BPS to 56 KBPS, preferably between 9.6 and 56 KBPS, and use a band of 902 to 928 MHz. The unit 32 has an antenna 34, here oriented to extend downwards. In this embodiment a lithium ion rechargeable battery 36 provides 7.2 volts dc for powering the unit 32 and the associated scanner 12. An ejector button 38 projects from a casing 40 beneath the position of the battery 36. This ejector button is in the form of a plunger, and is finger actuated to eject the battery from the housing 40 in order to replace or recharge the battery 36. The housing 40 is of compact, rectangular configuration and contains the battery 36 and unit 32 with a multiple-pin serial connector 42 mounted on the case or housing 40. This connector 42 can be a standard two-row connector, e.g., according to RS-232 protocol, or can be another equivalent electrical interface capable of binary serial data exchange. In this case a nine-pin, two row configuration connector is used to match a mating connector that terminates the cord 20 of the scanner 12. The entire interface device 14 of FIG. 1 has an overall dimension of about 4 cm by 4 cm by 7.6 cm, and weights about 200 grams, including the battery 36.

Figure 4:
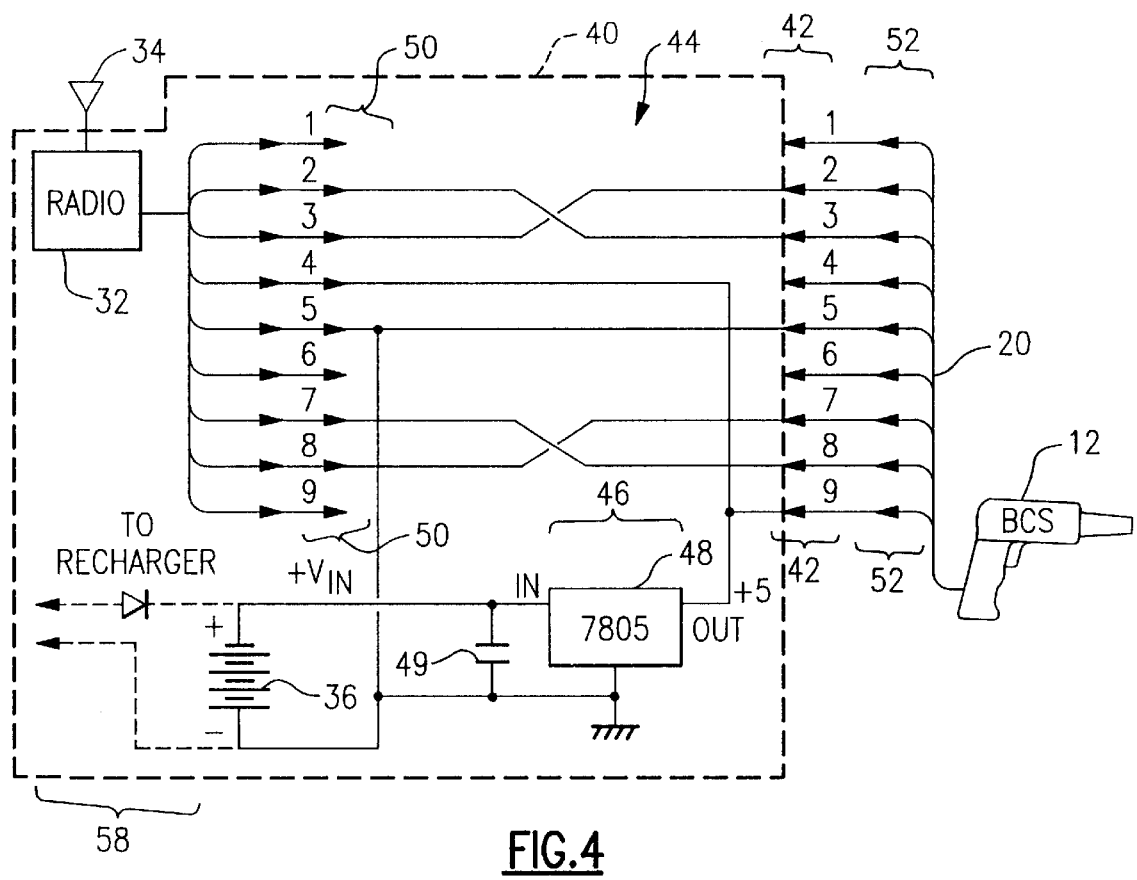
FIG. 4 is a wiring diagram, with connector pin assignments, for this embodiment.

A wiring harness or similar wiring arrangement 44 is also disposed within the housing 40 for interconnecting the battery 36, the interface unit 32, and the connector 42, and a diagram of the wiring harness is shown in FIG. 4. An optional voltage regulator arrangement 46 is formed of a 7805 voltage regulation integrated circuit 48 and an input capacitor 49. This IC 48 has an output terminal OUT that delivers +5.0 volts. The battery 36 is connected to the IC 48 between its input terminal IN and its ground terminal. A multiple-pin connector 50 couples to a mating connector (not shown) of the RF interface unit 32. Here, FIG. 4 shows the pin assignment, with pin numbers 2, 3, 7, and 8 for data communication, the dc voltage +5 V being imposed on pin number 4 and ground on pin number 5. On the other side of the diagram, the serial connector 42 mates with a connector 52 that terminates the scanner cord 20. Here, the pin assignments are shown, with pins numbers 2, 3, 7, and 8 being used for data communication, with ground on pin number 5 and +5 volts imposed on pin number 9. Preferably, the battery is removed for recharging, by depressing the ejection button 38. However, a recharger connection can be included optionally, here shown as the recharger terminal 58, to permit recharging in the housing or case 40.

In addition, keyboard wedge software may be provided for programming the computer 26 so that scanned data appear as keyboard entered data on a typical operating system, e.g., Windows 95, Windows 98, or Windows NT/2000.

Figure 5:
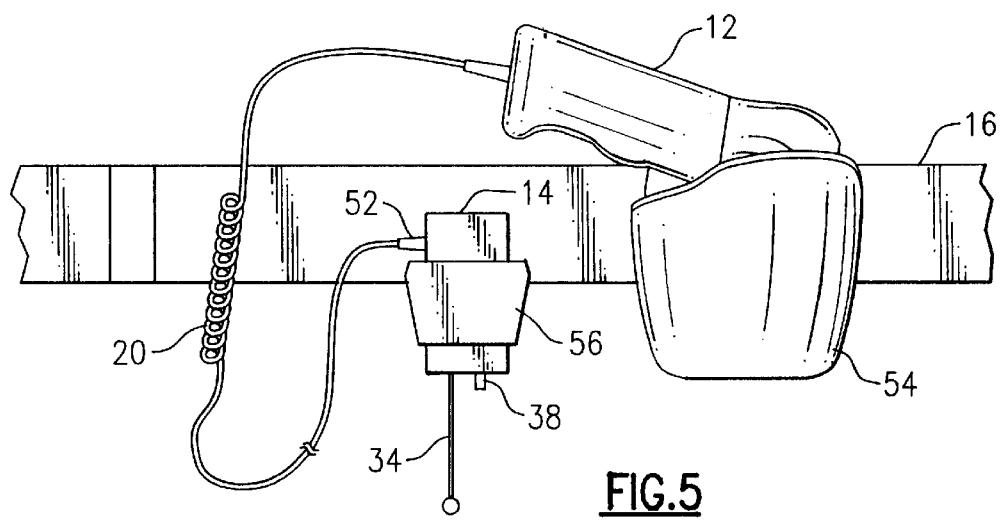
FIG. 5 is a perspective view of a belt and holster arrangement for a hand-held gun-type scanner and wireless interface device according to an embodiment of this invention.

FIG. 5 illustrates a web belt arrangement, by means of which the worker 10 can carry on his or her person the scanner 12 and the interface device 14 of this invention. Here the web belt 16 has a holster 54 for holding the scanner 12, which here is a gun-type hand held scanner, and a holster 56 for the interface device 14. The wireless interface device 14 can be carried on the belt near the small of the worker's back, with the cable 20 connecting it to the scanner 12. This view shows the connector 52 terminating the cable 20 and connecting to the interface device 14. The web belt may further contain a pouch or pocket for a spare battery or for other accessories.

Hand-held scanners of other designs or other input devices may also be employed, depending on the user's requirements. Moreover, rather than the one-dimensional symbol scanner, the scanner may be the type to recognize two-dimensional symbols. Also, scanners may be employed that recognize symbols other than standard one-dimensional or two-dimensional bar codes, and may include scanners that are capable of general image recognition, without departing from the basic principles of this invention. Also, rather than optical scanner, the data input device may be a magnetic code reader, a proximity-type reader, or other available or future technology. In addition to scanning, the invention may be used for remote printing of bar code labels or other optical indicia. A scanner and a printer can both be connected through the connector at the same time to the interface device 14, by means of a splitter adapter or wye connector 60, as described below in connection with FIGS. 6 to 8. Still further, rather than UHF radio waves, the interface device 14 and wireless interface unit 18 may be configured to communicate via ultrasound, VHF, microwave, infrared, or visible wavelengths.

The wye connector or splitter adapter 60 can be configured as shown in FIGS. 6 and 7, with a female 9-pin connector 62 that mates with the connector 42 on the interface device 14, and a male 9-pin serial interface connector 64 that receives the scanner connector 52. There is also another interface connector 66, here an RJ12 connector, that a portable printer or other device can plug into. These are fitted into a case 68. A pair of screw fittings 70 in the splitter adapter case 68 fasten into threaded receptacles in the serial interface connector 42.

Figure 8:
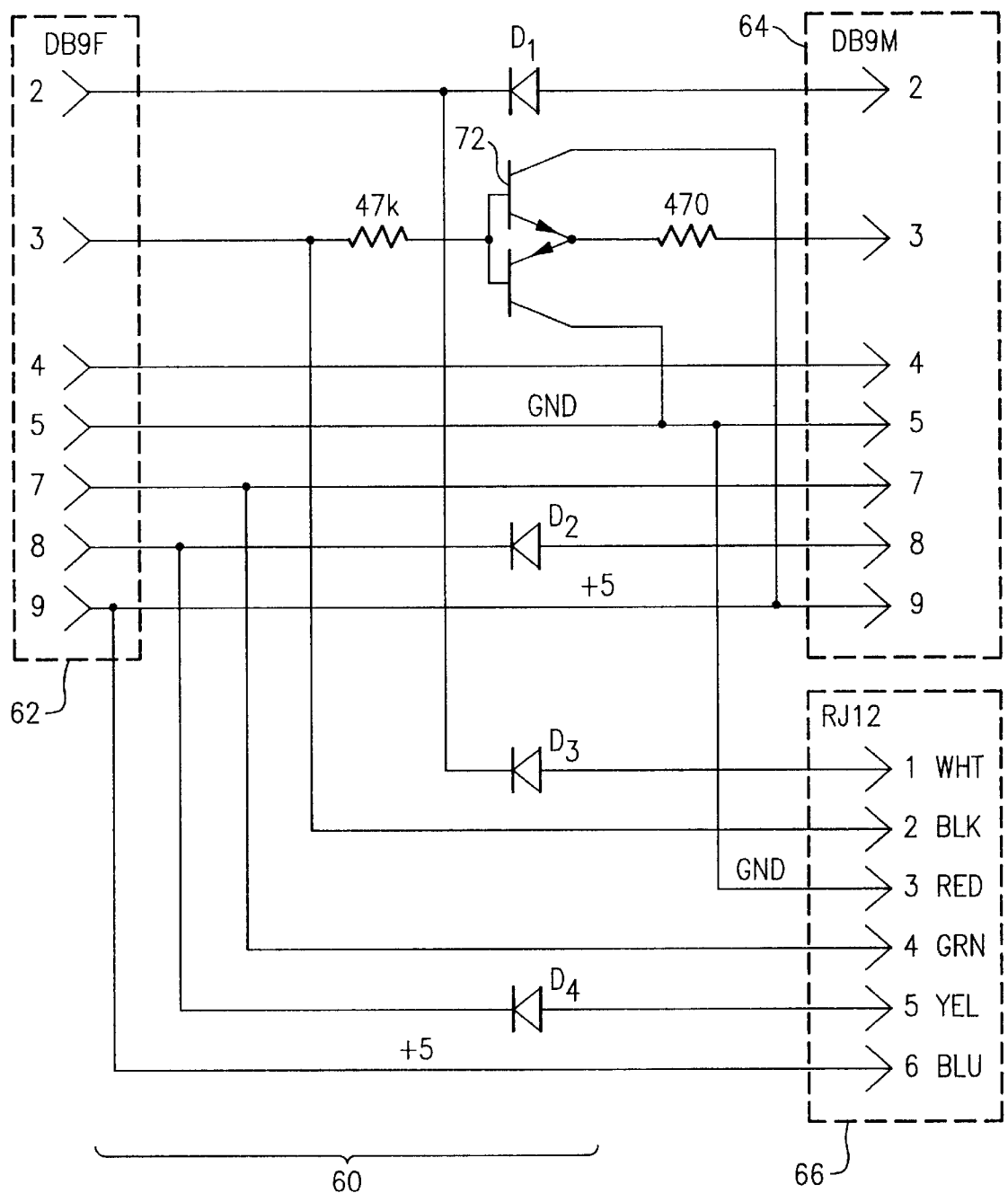
FIG. 8 is a wiring diagram, showing connector pin assignments, for an embodiment of the splitter adapter of FIGS. 6 and 7.

One format of the internal wiring for this example of the splitter adapter 60 is shown in FIG. 8. Between the connectors 62, 64, pins 4, 5, 7, and 9 are connected directly, with diodes $D_1$, $D_2$ between pins 2 and pins 8, respectively. Diodes $D_3$ and $D_4$ are interposed between connectors 62 and 66, respectively, between pin 2 of connector 62 and pin 1 of connector 66 and between pin 8 of connector 62 and pin 5 of connector 66.

A transistor buffer 72 is formed of an NPN-PNP pair with bases connected through an input resistor to pin 3 of connector 62 and pin 2 of connector 66; emitters joined together and coupled through a load resistor to pin 3 of connector 64; and with their collectors respectively connected to the lines joining pins 9 and pins 5 of the connectors 62 and 64.

Other signal splitter configurations are possible, depending on the types of devices that are to be employed.

Typical applications of this invention include portable bar code scanning, industrial component tracking, inventory control management, signature recognition, hand-held global positioning systems, route automation, factory automation, work in progress, labor management, point-of-sale (i.e., retail), event admission and ticket reading, security and personnel recognition, automated manufacturing, barcode printing, and trade show processing.

While the invention has been described and illustrated in respect to a few selected preferred embodiments, it should be appreciated that the invention is not limited only to those precise embodiments. Rather, many modifications and variations would present themselves to those of skill in the art without departing from the scope and spirit of this invention, as defined in the appended claims.

I claim:

1. In combination, an accessory for wirelessly and universally connecting any of a variety of data input devices to a remote data processing station, the combination comprising a two-way wireless interface unit adapted for universal interconnection to a one such data input device that is carded by a person and adapted to communicate wirelessly through a remote wireless interface unit with a said data processing station that is located remote from the person; a battery supplying direct current (DC) electrical power at a voltage sufficient to drive said two-way wireless interface unit; a standard multiple-pin connector adapted to connect with a data collection device that has a cable that terminates in a mating multiple-pin connector; and a wiring arrangement connecting said battery, said two-from way wireless interface unit, and said standard multiple-pin connector for permitting data to pass between said interface unit and selected pins of said standard connector, and imposing said DC power on a predetermined pin of said standard connector and also on a power lead going to the interface unit, such that said battery also powers said data collection device; said cable being an elongated flexible cord that extends from said data collection device to said mating multiple-pin connector, and thence to said standard connector and to the wiring arrangement for carrying data from said data collection device and for carrying said DC power from said battery to said data collection device; such that any other available data collection device having a cable terminated in a similar standard multiple-pin connector can be substituted for the first-mentioned data collection device.

2. The combination according to claim 1 wherein said wiring arrangement includes a voltage regulator interposed between said battery and said predetermined pin of said connector.

3. The combination according to claim 1 wherein said battery includes a rechargeable battery, and Her comprising a finger actuated plunger ejector for ejecting the battery whereby the battery may be replaced or recharged.

4. The combination according to claim 1 wherein said connector includes an RS-232 connector.

5. The combination according to claim 1 wherein said connector includes a ninepin connector.

6. A wireless arrangement for permiitting any of a variety of data collection devices to be carried by a person and used remotely from a data entry and processing station at a distance from the person, the data collection device having an elongated flexible cable extending therefrom that terminates at a device multiple-pin connector and having pins for supplying power to the device and pins for signal to and from the device, comprising a housing, a two-way wireless interface unit disposed within said housing and adapted for interconnection with a data input device and adapted to communicate wirelessly via a remote wireless interface unit with said data entry and processing station; a battery disposed within said housing supplying direct current (DC) electrical power at a voltage sufficient to drive said two-way wireless interface unit; a standard multiple pin connector mounted on said housing and adapted to connect with said data collection device through said cable and device multiple-pin connector; and a wiring arrangement within said housing connecting said battery, said two-way wireless interface unit, and said standard multiple-pin connector for permitting data to pass between said interface unit and selected pins of said standard connector, and also imposing said DC power on a predetermined pin of said standard connector, such that said battery also powers, said data collection device; wherein said cable includes a flexible elongated cord connecting said data collection device and the device multiple-pin connector of said wiring arrangement such that said cable carries data to and from said data collection unit and carries said DC power to said data collection device, such that any other available data collection device having a cable terminated in a similar device multiple-pin connector can be substituted for the first-mentioned data collection device.

7. The wireless arrangement of claim 6 comprising an ejector on said housing which may be finger actuated to eject said battery from said housing whereby the battery may be replaced or recharged.

8. The wireless arrangement of claim 6 wherein said connector is a nine-pin connector.

9. The wireless arrangement of claim 6 further comprising a belt to be worn by an operator, a first holster on said belt for holding said wireless arrangement on said belt; and a second holster on said belt adapted to hold said data collection device.

10. The wireless arrangement of claim 9 wherein said data collection device is a gun-type hand-held bar code scanner.

11. The wireless arrangement of claim 6 wherein said wiring arrangement includes a voltage regulator having inputs connected to said battery and an output connected to said predetermined pin of said connector.

12. A wireless arrangement for permitting a data collection device to be used remotely from a data entry and processing station, comprising a housing, a two-way wireless interface unit disposed within said housing and adapted for interconnection with a data input device and adapted to communicate wirelessly via a remote wireless interface unit with said data entry and processing station; a battery disposed within said housing supplying direct current (DC) electrical power at a voltage sufficient to drive said two-way wireless interface unit; a multiple pin connector mounted on said housing and adapted to connect with said data collection device through a cable that terminates in a mating multiple-pin connector; and a wiring arrangement within said housing connecting said battery, said two-way wireless interface unit, and said multiple-pin connector for permitting data to pass between said interface unit and selected pins of said connector, and also imposing said DC power on a predetermined pin of said connector, such that said battery also powers said data collection device; wherein said cable includes a flexible elongated cord connecting said data collection device and the multiple pin connector of said wiring arrangement such that said cable carries data to and from said data collection unit and carries said DC power to said data collection device; and further comprising a splitter adapter interposed between said multiple pin connector and the mating multiple-pin connector of said data collection device; including additional multiple pin connectors for mating with said multiple pin connector and said mating multiple-pin connector, respectively; and an additional interface connector for connecting to an additional external device.

13. The wireless arrangement of claim 12, wherein said splitter adapter includes a housing and means for fastening the splitter adapter housing onto the housing of said wireless interface device.

14. The wireless arrangment of claim 12, wherein said splitter adapter includes at least one buffer device between predetermined pins of said additional multiple pin connectors.

15. The combination according to claim 1 wherein said wiring arrangement includes a second multiple-pin connector that mates with a multiple-pin connector on said wireless interface unit, said battery imposing DC power onto a predetermined pin of said second connector.

16. The wireless arrangement of claim 6 wherein said wiring arrangement includes a second multiple-pin connector that mates with a multiple-pin connector on said two-way wireless interface unit, and said battery imposing said DC power onto a predetermined pin of said second connector.

* * * * *

UNITED STATES PATENT AND TRADEMARK OFFICE
CERTIFICATE OF CORRECTION

PATENT NO. : 6,581,837 B1
DATED : June 24, 2003
INVENTOR(S) : John R. Hattersley It is certified that error appears in the above-identified patent and that said Letters Patent is hereby corrected as shown below:

<u>Column 5,</u>
Line 9, the number "5" should be deleted
Line 52, "carded" should read -- carried --
Line 61, "two-from way" should read -- two-way --

<u>Column 6,</u>
Line 15, "Her" should read -- further --

Signed and Sealed this

Seventh Day of October, 2003

JAMES E. ROGAN
*Director of the United States Patent and Trademark Office*